United States Patent
Berger et al.

(10) Patent No.: US 12,275,085 B2
(45) Date of Patent: Apr. 15, 2025

(54) DETERMINATION OF TRANSITION PHASES FOR TRANSFORMING DIFFERENT DYNAMIC LASER BEAM SHAPES FOR A LASER CUTTING MACHINE

(71) Applicant: BYSTRONIC LASER AG, Niederönz (CH)

(72) Inventors: Michael Berger, Bern (CH); Titus Haas, Zofingen (CH); Simon Scheidiger, Langenthal (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/701,001

(22) PCT Filed: Oct. 24, 2022

(86) PCT No.: PCT/EP2022/079622
§ 371 (c)(1),
(2) Date: Apr. 12, 2024

(87) PCT Pub. No.: WO2023/072845
PCT Pub. Date: May 4, 2023

(65) Prior Publication Data
US 2024/0335904 A1    Oct. 10, 2024

(30) Foreign Application Priority Data
Oct. 25, 2021   (EP) .................................... 21204469

(51) Int. Cl.
*B23K 26/073*    (2006.01)
*B23K 26/38*    (2014.01)

(52) U.S. Cl.
CPC ............ *B23K 26/073* (2013.01); *B23K 26/38* (2013.01)

(58) Field of Classification Search
CPC .. B23K 26/064; B23K 26/062; B23K 26/073; G05B 2219/45041; G05B 2219/36199; G05B 2219/49353
See application file for complete search history.

(56) References Cited

U.S. PATENT DOCUMENTS

| | | | |
|---|---|---|---|
| 2010/0059490 A1* | 3/2010 | Unrath | B23K 26/705 219/121.73 |
| 2017/0368638 A1* | 12/2017 | Tayebati | B23K 26/0626 |

(Continued)

FOREIGN PATENT DOCUMENTS

| | | | | |
|---|---|---|---|---|
| WO | WO-2019145536 A1 * | 8/2019 | | B23K 26/048 |
| WO | 2019/179603 A1 | 9/2019 | | |

OTHER PUBLICATIONS

International Search Report and Written Opinion, mailed Feb. 27, 2023, from PCT/EP2022/079622, 9 pages.

(Continued)

*Primary Examiner* — Geoffrey S Evans
(74) *Attorney, Agent, or Firm* — Workman Nydegger

(57) ABSTRACT

A control unit for providing control instructions for controlling a laser cutting machine by determining transition phases for transforming different dynamic laser beam shapes for the laser cutting machine, for dynamically varying the shape of the laser beam is disclosed. The control unit includes a cutting plan interface for receiving a cutting plan for cutting out parts of a workpiece that are each defined by a cutting segments ordered in a queue, an allocation tool configured to allocate a specific dynamic laser beam shape to each cutting segment, a transition tool for determining transition phases between each two consecutive specific dynamic laser beam shape, and a processor configured for determining a specific dynamic laser beam shape for each cutting segment and for determining all transition phases between each two (Continued)

consecutive specific dynamic laser beam shapes and for providing controlling the laser cutting machine for executing the received cutting plan.

12 Claims, 11 Drawing Sheets

(56) References Cited

U.S. PATENT DOCUMENTS

| | | |
|---|---|---|
| 2018/0188544 A1* | 7/2018 | Gross .................... G02B 6/255 |
| 2020/0298335 A1 | 9/2020 | Nakamura |
| 2020/0331096 A1 | 10/2020 | Watanabe |
| 2022/0342316 A1* | 10/2022 | Kooiman ............ G03F 7/70625 |
| 2023/0321750 A1* | 10/2023 | Ishikawa .............. B23K 26/042 |
| | | 219/121.6 |

OTHER PUBLICATIONS

International Preliminary Report on Patentability, mailed Jan. 16, 2024, from PCT/EP2022/079622, 17 pages.

Goppold et al., "Dynamic beam shaping for thick sheet metal cutting", IWS, Lasers in Manufacturing Conference 2017.

* cited by examiner

DETERMINATION OF TRANSITION PHASES FOR TRANSFORMING DIFFERENT DYNAMIC LASER BEAM SHAPES FOR A LASER CUTTING MACHINE

The present invention relates to laser cutting by means of a laser cutting machine, which is provided with at least one optical module, e.g., a dynamic laser beam shaping module, for dynamically varying the shape of the laser beam. In particular, the present invention refers to a method for determining transition phases for transforming different dynamic laser beam shapes during laser cutting, a control unit and a computer program.

In laser cutting applications, high quality and performance are key factors amongst others.

Generally, a laser cutting process may be optimized for contrary demands, like inter alia productivity and quality. The higher the feed rate of the laser cutting head, the higher is the productivity but quality may be diminished, as the laser beam acts upon material with a certain energy distribution defined by e.g., spot size, laser beam shape and laser power. Key factor for cutting is transforming absorbed laser energy into heat, to melt material. The energy coupling is determined by many factors and interacts with cut kerf conditions for instance.

For optimizing the above-mentioned demands, in state of the art it is known to influence the beam profile by means of e.g., varying the intensity distribution, the spot size, laser beam shape, and focal position. A first option to obtain such modifications presents static beam shaping (SBS), prevailing by spatial methods. By using SBS, the laser beam is provided before treatment starts and cannot be changed anymore. A second option is to modify a laser beam having a dynamic character. In this case, properties of the laser beam may change during processing by dynamic laser beam shaping (DBS). Alternatively, some spatial modulation methods could be also performed dynamically, e.g., by adaptive optics. In this respect it is referred to "Dynamic beam shaping for thick sheet metal cutting", Cindy Goppold, Thomas Pinder, Patrick Herwig, IWS, in: Lasers in Manufacturing Conference 2017.

When using DBS, by the spatiotemporal distribution of laser energy over the material surface, a crucial challenge is addressed: sufficient kerf dimensions at a decreasing spot size to gain the obtainable laser energy. For this purpose, high laser energy of a small spot size oscillates periodically and is superimposed with the feed rate. Thus, energy is distributed around the generated cut kerf and thereby acting as an artificial bigger spot. At that, kerf width is enlarged, which procure an unimpeded melt ejection. Moreover, the distribution prevents heat accumulations, because interaction time of laser beam to material is decreased.

For applying a DBS, the laser cutting machine is equipped with a dynamic laser beam shaping module. An example embodiment with such a DBS application is described in WO 2019 145 536 A1.

From US 2010/0059490 A1 it is known to quickly modify a laser processing beam and in particular its spatial intensity profile.

It is an object of the present invention to improve the quality of the cutting result and to enhance the flexibility when applying a dynamic laser beam shaping.

This object is achieved by the appended independent claims. Further advantageous embodiments and features are mentioned in the dependent claims and in the following description.

According to a first aspect, the present invention relates to a computer-implemented method for determining transition phases for transforming different dynamic laser beam shapes for laser cutting by means of a laser cutting machine. The laser cutting machine comprises at least one optical module, which may e.g. be implemented as a dynamic laser beam shaping module, for dynamically varying the shape of the laser beam. The method may at least comprise the method steps of:

Receiving a cutting plan to be processed for cutting out parts of a workpiece, wherein each part is defined by a cutting contour consisting of cutting segments, which are ordered in a queue;

Providing an allocation tool, which is configured to allocate a specific dynamic laser beam shape from a set of dynamic laser beam shapes to each cutting segment in the queue of cutting segments according to predefined allocation criteria;

Accessing the allocation tool iteratively for determining a specific dynamic laser beam shape for each cutting segment of the queue of cutting segments;

Providing a transition tool for determining transition phases between each two (previously determined) consecutive specific dynamic laser beam shapes, wherein a first specific dynamic laser beam shape of the two consecutive specific dynamic laser beam shapes is transformed into a second specific dynamic laser beam shape of the two consecutive specific dynamic laser beam shapes within a transition time (t); the transition time (t) is unequal to "0" and in particular, the transition time is more than 0 ms. The transition time may be in a range in between 0.05 ms and 10.000 ms. The transition time is a time phase for providing a smooth transition between two consecutive transition zones.

Accessing the transition tool for determining all transition phases between each two consecutive specific dynamic laser beam shapes;

Providing control instructions with the determined transition phases for controlling the laser cutting machine for executing the received cutting plan by applying:
  the specific dynamic laser beam shape for each of the cutting segments in the queue of cutting segments, which has been determined by the allocation tool,
  the determined transition phases between each two consecutive specific dynamic laser beam shapes for each of the cutting segments of all parts to be cut according to the received cutting plan, wherein the transition phases have been determined by the transition tool.

With this method and the solution according to the present invention, contour errors are further minimized and cutting quality is enhanced as there will be no hard switch from one dynamic laser beam shape to a directly following or consecutive one. The transition between different dynamic laser beam shapes is smoothed and improved. Enhanced cutting quality thereby includes an enhanced smoothness of the cutting edge, a minimization of burr (adhesion of melt adjacent to the cutting edge), minimization of expelled melt particles and a minimization of the risk of tear-off of the laser beam during cutting.

In a preferred embodiment, the transition may be calculated algorithmically, in particular, velocity-dependent.

The transition time (duration of the transition) may be determined or calculated automatically by means of a transition time algorithm. The transition time algorithm may be configured to determine the time for transition between two consecutive segments and/or applied dynamic laser beam shapes. The transition algorithm may be configured to calculate the transition time between the respective two consecutive segments in dependence of transition parameters, selected from the group consisting of cutting speed of the two consecutive segments, type of cutting segments and/or the kind of Lissajous figure before and after the transition zone and on the material-properties of the material to be cut, e.g., material type and/or material thickness.

The allocation of a dynamic laser beam shape for a segment by the allocation tool is executed for each segment iteratively, segment after segment. The allocation is preferably segment-specific. Different types of segments (e.g. curve or straight line) will be allocated to different dynamic laser beam shapes.

In a preferred embodiment, the method may further comprise an intermediate verification step. After the allocation (segment—dynamic laser beam shape) has been calculated by the processor, this allocation may be provided on a user interface for the purpose of verification. In case a verification signal is detected the calculated allocation may be applied. Otherwise, a correction measure may be initiated. The correction measure may be implemented as an offline algorithm (offline may refer to e.g., independent of and/or not during the cutting procedure) for calculating another (optimized) allocation. Alternatively or in addition, the correction measure may be implemented as an online algorithm (online may refer to e.g., during the cutting procedure). The "another (optimized) allocation" may be determined manually on the user interface by the user via manual input and/or may be determined algorithmically by e.g., taking into account historic data of other allocations or statistical evaluations (e.g. mean value).

Generally, the laser cutting machine may comprise more than one optical model, which assist in or cause varying the laser beam dynamically. For example, two (2) galvo scanner mirrors, one for movement in X and one in Y may be used. Alternatively, or in addition, 3D beam shaping may be achieved by means of a 2-axis module for X/Y variation and/or a Z-wobbling module for movement in the direction of the beam axis. Alternatively, or in addition, a CIVAN laser system may be used for shaping the beam by interconnection of e.g., 32 single optical modules.

According to an advantageous embodiment, the cutting segments are selected from the group, comprising:
Straight line;
Circle or circle segments with a configurable particular radius;
Corner with a configurable particular angle;
Parameterized curve;
Pierce-in;
Lead-in;
Lead-out and/or
Engraving.

According to another advantageous embodiment, the allocation tool and/or the transition tool (these terms will be defined later in the text) may comprise or may access a trained model, in particular a neural network model. The neural network may be, for example, a convolutional neural network (CNN).

The neural network has been trained to determine a transition phase for transforming a dynamic laser beam shape between two consecutive cutting segments. For instance, for segment i and segment i+1 the neural network or machine learning model is trained to provide a transition phase for transforming the dynamic laser beam between segment i and segment i+1. The trained neural network model may be stored e.g., on a cloud-based sever, which is in data exchange with the control unit.

The (deep) machine learning algorithms are data and computation intensive and are therefore preferably computed on a graphics processing unit (GPU) or a tensor processing unit (TPU) or networks of processors. Each layer of the neural network can be computed on powerful massively parallelizable processors, especially multi-core or many-core processors. The computing unit is preferably designed as or comprises a graphics card or the other hardware modules mentioned above.

The machine learning model may preferably be trained to recognize transition phases without a preceding analysis of properties (or features-feature extraction), which properties/features, in particular which spatial and/or temporal properties, of the first and second cutting segment are relevant for the determination of the transition phase.

Alternatively or in addition a feature-extractor-free (or feature-free) algorithm may be applied. This means that a so-called end-to-end algorithm can be implemented. "End-to-end" in this context means that the raw data, i.e., the acquired transition phases, can be used without substantial preprocessing and, in particular, without manual determination of the features in the cutting segments and its processing, which are subsequently further processed (e.g., classified) to a result using a machine learning algorithm (also referred to as ML algorithm for short in the following). "Without significant preprocessing" in this context means apart from marginal preprocessing, such as histogram equalization, image depth reduction and/or region of interest (ROI) cropping. In particular, the end-to-end approach does not require separate preprocessing of the raw data to extract the 'features' that are important for learning. In contrast to the classical ML approach with preceding feature extraction, in the solution presented here not only the classificator is trained by an algorithm, but preferably also the feature extractor in the same step. This means that the algorithm independently calculates or learns representations from the input data (cutting segments) and thus also the "features". To recognize this relationship, the algorithm must independently find the best representation of the input data in order to classify it. The fact that no characteristic values ('features') have to be extracted in a preferred embodiment of the invention is advantageous in several ways. First, the effort of algorithm development can be simplified, since the important features do not have to be detected, not determined, and not extracted.

Further it is advantageous that with the "feature-free" algorithm development the danger does not exist that most important features, which would contain the most information, can be overlooked. In the end, the essential information is often also contained in very complex, superimposed or hardly graspable signal, image or representation of the cutting sequence features, which makes an optimal feature analysis difficult. Therefore, it is not surprising that the deep learning approach implemented here is superior to feature extractor-based approaches without any feature extraction.

The neural network may have been trained with a training algorithm based on annotated or partially annotated training data, which comprise an assessment of the cutting result with the applied transition phase. The training algorithm may be a supervised learning method or a semi-supervised learning method. The training algorithm may be based on historical data. Reinforcement learning methods can also be used to update or adapt the models. Reinforcement learning makes it possible to find solutions to this complex problem without initial data and (prior) knowledge about the laser cutting process and the transition phases. In addition, reinforcement learning eliminates the need for time-consuming collection and processing of training data.

In order to map the transition phase to the sequence of cutting segments a CNN or a deep neural network (DNN) can be applied. Alternatively or in addition so-called gated recurrent units (GRU) or long short-term memory networks (LSTM) can be applied, in particular in combination with the CNN to learn time-dependent features.

According to another advantageous embodiment, the transition tool comprises an assessment tool, wherein the assessment tool is configured for assessing the determined and applied specific dynamic laser beam shapes and/or transition phases manually by means of using a user interface and/or automatically by a sensory automatic assessment unit for providing an assessment dataset. The sensory automatic assessment unit may comprise an in process optical system, in particular a camera and/or a set of diodes. Also, both may be combined, so that both modes (automatic and manual mode) may be used as verification step, which may be provided as a semi-automatic mode. So, for example, first the sensory automatic assessment unit may provide a first assessment dataset automatically, which may be subject to a verification step by manual input (via a human machine interface). Based on the manual input, a second assessment dataset is generated. The second assessment dataset may be compared with the first one and in case of deviations being higher than a preconfigured threshold, a warning message may be generated, indicating that the assessment may be subject to further evaluation and/or verification.

According to another advantageous embodiment, the assessment dataset comprises setting a configurable share of different assessment criteria in common, comprising a quality assessment, a performance assessment, an energy consumption assessment, and/or a process stability assessment, wherein the different assessment criteria have interdependencies which are modelled on a user interface selection button, provided on a human machine interface. The user interface selection button is configured such that inconsistent input is not possible anymore. So, e.g., if a user would like to input a highest ranking for quality and in addition a highest ranking for performance and in addition also a lowest ranking of energy consumption, this would be evaluated as inconsistent and denied as admissible input. The user is requested to input corrected values.

In another advantageous embodiment, the transition phases for each two consecutive specific dynamic laser beam shapes are determined specifically for a type of material property and/or a type of cutting machine. The type of material property may comprise a material type (type of material, like steel, alloy, aluminum etc.) and/or material thickness (e.g., for flat material with a thickness in between 0.1 mm to 100 mm).

In another advantageous embodiment, the transition phases for each two consecutive specific dynamic laser beam shapes are determined in dependence of a speed and/or acceleration and/or jerk of the laser cutting head and/or of a type of cutting segment and/or of laser cutting process parameters, including laser power and/or dynamic limits of drives.

In another advantageous embodiment, the transition phase is determined by generating focal point oscillation schemes by spatiotemporal distribution of laser energy over a focal plane and/or a material surface with respect to:
  a frequency in X and Y and preferably in X and Y and Z direction;
  an amplitude in X and Y and preferably in X and Y and Z direction; and/or
  a phase shift in Y compared to X direction, preferably in Y and Z compared to X direction.

Alternatively or in addition the dynamic laser beam shape is varied by oscillations of the focal point in X and Y direction (with respect to frequency and/or amplitude), which may be combined with a wobbling (in Z direction) with the laser beam diameter change.

Alternatively or in addition contour errors may be determined (estimated and/or measured) and these determined contour errors are compensated. Compensating the contour errors may be executed by means of an amended calculation of the allocation. Measuring the contour errors may be executed by means of a, e.g. coaxial, camera.

The contour deviation is known due to the previous measurement in X and Y direction ($C_{x(t)}$, $C_y(t)$) for each position or time step. At least two methods exist to compensate the contour errors (Offset, DBS Amplitude):

Method Offset:

This contour error values are used as offset values for the dynamic laser beam shape. Since the contour errors varies over the part/time, each position/time step has a different offset value Example The dynamic laser beam shape is a Lissajous figure LF_1

$$LF_1 = \begin{pmatrix} x_1 = A_1\sin(a_1 t + \phi_1) \\ y_1 = B_1\sin(b_1 t) \end{pmatrix}$$

the contour-error-compensated-Lissajous figure is LF_2

$$LF_2 = \begin{pmatrix} x_1 - c_x(t) \\ y_1 - c_y(t) \end{pmatrix}$$

DBS Amplitude:

Instead of using an offset, the amplitude of the dynamic laser beam shape can be adapted over the part/time.

Example $$LF_3 = \begin{pmatrix} (A_1 - c_x(t))\sin(a_1 t + \phi_1) \\ (B_1 - c_y(t))\sin(b_1 t) \end{pmatrix}$$

In another advantageous embodiment, in determining the transition phases between each two consecutive specific dynamic laser beam shapes where a first specific dynamic laser beam shape of the two consecutive specific dynamic laser beam shapes is transformed into a second specific dynamic laser beam shape of the two consecutive specific dynamic laser beam shapes, a transfer function $f$ is applied which transfers the first specific dynamic laser beam shape of the two consecutive specific dynamic laser beam shapes in the second specific dynamic laser beam shape, wherein the transfer function $f$ transforms a frequency, an amplitude and/or a phase shift of the first dynamic laser beam shape. In still another advantageous embodiment, the transfer function $f$ may be linear, higher order exponential, trigonometric, or logarithmic.

In another advantageous embodiment, the transition tool for determining the transition phases between each two consecutive specific dynamic laser beam shapes is configured for determining a transition phase between each two consecutive specific dynamic laser beam shapes, which differ from each other. Usually, a first cutting segment differs from the consecutive second cutting segment per definition. For instance, the first cutting segment may be a straight-line segment and the second segment may be a corner segment with a curve. In this case, the first cutting segment differs from the second one. However, the queue of cutting segments may be defined differently, so that a first cutting segment may be of a first type and the second cutting segment may be of the same (first) type. In the latter case, the transition tool does not need to be accessed so that no transition phase will be calculated between two identical or similar consecutive cutting segments, in order to reduce computing resource consumption. The definition of cutting segments may be configured in a preceding configuration phase, by means of user input. The similarity of the cutting segments may be defined according to a predefined scheme. For example, a straight-line segment, followed by another straight-line segment, in a slightly different angle may be judged to be similar. Threshold values may be defined in a preparation phase of the method.

Up to now, the invention has been described with respect to the claimed method. Features, advantages or alternative embodiments herein can be assigned to the other claimed objects (e.g., the computer program or the control unit) and vice versa. In other words, the apparatus or device can be improved with features described or claimed in the context of the method and vice versa. In this case, the functional features of the method are embodied by structural units of the apparatus or device or system and vice versa, respectively. Generally, in computer science a software implementation and a corresponding hardware implementation (e.g., as an embedded system) are equivalent. Thus, for example, a method step for "receiving" data (e.g., a cutting plan) may be performed with an interface and respective instructions to receive data. For the sake of avoiding redundancy, although the device may also be used in the alternative embodiments described with reference to the method, these embodiments are not explicitly described again for the device According to another aspect, the above-mentioned object is solved by a control unit for providing control instructions for controlling a laser cutting machine by determining transition phases for transforming different dynamic laser beam shapes for the laser cutting machine, comprising at least one optical module, which in a preferred embodiment may be implemented as a dynamic laser beam shaping module, for dynamically varying the shape of the laser beam. The control unit is configured for executing the method as described above. The control unit may comprise:

A cutting plan interface for receiving a cutting plan to be processed for cutting out parts of a workpiece, wherein each part is defined by a cutting contour consisting of cutting segments, which are ordered in a queue;

An allocation tool, which is configured to allocate a specific dynamic laser beam shape from a set of dynamic laser beam shapes to each cutting segment in the queue of cutting segments according to predefined assessment criteria;

A transition tool for determining transition phases between each two consecutive specific dynamic laser beam shapes, wherein a first specific dynamic laser beam shape of the two consecutive specific dynamic laser beam shapes is transformed into a second specific dynamic laser beam shape of the two consecutive specific dynamic laser beam shapes within a transition time;

A processor, which is configured for accessing the allocation tool iteratively for determining a specific dynamic laser beam shape for each cutting segment of the queue of cutting segments and wherein the processor is further configured for accessing the transition tool for determining all transition phases between each two consecutive specific dynamic laser beam shapes and wherein the processor is configured for providing control instructions for controlling the laser cutting machine for executing the received cutting plan by applying:

the specific dynamic laser beam shape for each of the cutting segments in the queue of cutting segments, which has been determined by the allocation tool, the determined transition phases between each two consecutive specific dynamic laser beam shapes for each of the cutting segments of all parts to be cut according to the received cutting plan, wherein the transition phases have been determined by the transition tool.

In another aspect the invention relates to a computer program comprising a computer program code, the computer program code when executed by a processor causing the processor to perform the steps of the method as described above.

In another aspect the invention relates to a computer readable storage medium in which computer program as described above is stored.

In the following the terms used within this application are defined.

The at least one optical module is configured for assisting in and/or causing a variation of the laser beam dynamically. The at least one optical module may comprise a dynamic laser beam shaping module. The dynamic laser beam shaping module is configured for dynamically change the shape of the laser beam during cutting a contour according to the cutting plan. The dynamic laser beam shaping module may apply a wobbling and/or a dynamic laser beam shaping. The dynamic laser beam shaping module may be configured to use also a combination of the before mentioned options, i.e., a combination of using the variable laser beam diameter with the wobbling of the focal position and the DBS parameters (X, Y axis).

A cutting segment typically is provided in an ordered series or queue of cutting segments. The cutting segments are ordered such as a first cutting segment is preceding a second one, which is preceding a third one etc. The cutting segments and/or the queue of cutting segments may be defined in a cutting plan or may be calculated from data within the cutting plan. The queue is, in particular, based on a cutting direction of the laser cutting head, moving over a surface of the workpiece to be cut. A cutting segment represents different types of cuts on a geometry according to the cutting plan to be executed. A cutting segment may be e.g., a straight line, a curve with varying radii (parameterized curve), which may represent a corner, a circle or circle segment, a pierce-in, a lead-in, a lead-out, and/or an engraving.

A transition phase is to be construed as a spatial and/or temporal phase for transforming a first specific dynamic laser beam shape in a consecutive second specific dynamic laser beam shape for two consecutive cutting segments in the queue of cutting segments. The transition phase refers to a transition between two different types of segments and/or two different applied dynamic laser beam shapes. The transition phase may be represented as a transition zone or pattern. The transition phase may be configured such that a smooth transformation between the respective two consecutive specific dynamic laser beam shapes is provided by defining the transition between two segments by the cutting speed. Along straight lines with maximal cutting speed, e.g., the horseshoe-shape is assumed to fit best the user-defined performance criteria. The slower the cutting speed, the more circular the dynamic laser beam shape is assumed to be best. Different phases of the transition may be provided, e.g., the dynamic laser beam shape at full speed, in the corner at zero speed and in between. Further examples, are provided in the detailed description.

A workpiece may be a metal workpiece. The workpiece may be a sheet or a tube workpiece. The workpiece may e.g., be a metal sheet of different type and/or having different thickness. Typically, the cutting plan defines the parts which need to be cut out of the workpiece. The parts to be cut out from the workpiece may have a particular contour, which may differ from part to part. For instance, a first set of circle parts need to be cut out completely from the workpiece and a second set of rectangle parts need to be cut out. Each part to be cut out may be defined by a cutting contour. The cutting contour may consist of a set or a number of cutting segments. For example, a rectangle part may comprise a first segment as a first straight-line segment, followed by second segment, being a corner segment (radius), followed by a third segment, being a second straight-line segment, followed by a fourth segment, being a corner segment, followed by a fifth segment, being a first straight-line segment again etc. The cutting contour defines the shape of a part from a top view.

The queue of cutting segments is defined by the movement direction of the cutting head. The queue is an ordered list of cutting segments, which are cut one after the other.

For each cutting segment a specific dynamic laser beam shape is defined and the solution presented herein focusses on determining the transition zones between these cutting segments. For all cutting segments and transition zones, cutting parameters need to be defined:

Focal position of laser beam.
Laser
  Power
  Frequency
  Pulse width.
Feed rate (desired cutting speed).
Cutting speed (dependent on geometry and dynamic capability of moving axes)
Nozzle distance
Nozzle type and diameter.
Gas pressure
DBS parameters (deflection in X and Y direction)
  X direction
    Frequency
    Amplitude
  Y direction
    Frequency
    Amplitude
  Phase shift
Wobbling of focal position in Z direction
Frequency
Amplitude.

The laser cutting machine is configured for applying a laser beam on a workpiece for thermal separation of workpiece material by laser radiation. The workpiece may be a tube workpiece or a flat, sheet-like workpiece with a cutting length of up to 12 meters and a width of 2 to 3 meters. The laser cutting machine may be configured for 3D metal sheets, like tubes or bended parts.

The laser cutting machine is equipped with at least one optical module. The laser cutting machine may, e.g., comprise a dynamic laser beam shaping module which may comprise e.g., a laser scanner optics (e.g., as described in WO2019145536A1) or a lens-optics which is actuated or oscillated in x and y directions perpendicular to the laser beam axis (as e.g., described in WO 2019/145536 A1). The technical purpose of the dynamic laser beam shaping (module), DBSM, is quality and/or performance improvement. In a certain aspect, the DBSM may be used to provide the energy on a bigger area on the workpiece. In particular, for a wider cut kerf width (which makes subsequent automation/sorting of parts easier) a higher amplitude of the dynamic laser beam shape and/or a different focal position to enlarge the spot size may be selected and used. Further, DBSM serves for providing less damage of material properties because of lower interaction time with high power laser (less heat accumulation), which is a major improvement. With respect to quality improvement: Amongst standard cutting parameters (focal position, laser power, gas pressure, . . . ) using additionally dynamic laser beam shapes allows, choosing the cutting and dynamic laser beam shaping parameters accordingly, to reach better quality and/or performance with higher dimensions of parameter space. Moreover, overall quality (also in corners and at transitions) and/or performance may be improved, due to the ability to change the dynamic laser beam shape, no compromise settings are demanded for straight lines and corners. It is preferred to adapt the dynamic laser beam shape during transition phases (e.g., cutting speed dependent). The dynamic beam shaping may be applied with different beam shaping frequencies. The beam shaping frequencies may be in the range between 100 Hz and one or more Mega Hz and preferably in the range between 100 Hz and 900 KHz or between 100 Hz and several hundred Kilo Hz. Preferably, the beam shaping frequency may be varied in each of the above-mentioned directions, i.e., in X and Y and even in Z direction. It has to be pointed out that in a preferred embodiment, the beam shaping frequencies may be set differently in each of these directions, so that e.g., in X direction a first beam shaping frequency of e.g., 200 Hz may be applied and in Y direction a second beam shaping frequency of e.g., 900 kHz may be used. The beam shaping frequency settings for each direction may be set and configured independently form each other on a user interface.

Alternatively, or in addition to changing the beam shaping frequency as mentioned above, also the laser pulse frequency may be varied. The laser pulse frequency may be varied in between 0 and 5 kHz. Typically, laser pulse frequency is only used for specific applications, e.g., engraving, pulsed cutting (e.g., when piercing, curves, corners) so that energy input may be regulated by pulsing. In a certain aspect, changing the pulse frequency of the laser beam may be used to reduce the energy to be provided on the workpiece. The setting of the laser pulse frequency may be configured on a human machine or user interface, HMI. The HMI may provide settings for configuration of the beam shaping frequency for each direction separately and in addition for configuration of the laser pulse frequency, in a combined form or in a separate manner.

The allocation tool and/or the transition tool is/are an electronic module or may be a software module, implemented in a hardware module with a processor or may be a hardware module (as described below, e.g., FPGA; ASIC).

In the context of the invention, a "processor" may be understood to mean, for example, a machine or an electronic circuit. In particular, a processor may be a central processing unit (CPU), a microprocessor or a microcontroller, for example, an application-specific integrated circuit or a digital signal processor, possibly in combination with a memory unit for storing program instructions, etc. A processor may also be, for example, an IC (integrated circuit), in particular an FPGA (field programmable gate array) or an ASIC (application-specific integrated circuit), or e.g., a multi-chip module, e.g., a 2.5D or 3D multi-chip module, in which in particular several so-called dies are connected to one another directly or via an interposer, or a DSP (Digital Signal Processor) or a GPU (Graphic Processing Unit). A processor can also be a virtualized processor, a virtual machine or a soft CPU. It can also be, for example, a programmable processor which is equipped with configuration steps for carrying out the said method according to the invention or is configured with configuration steps in such a way that the programmable processor implements the features according to the invention of the method, the component, the modules, or other aspects and/or partial aspects of the invention, like a FPGA or ASIC. The allocation tool and/or the transition tool may be part of a controller for controlling the laser cutting machine or may be a separate module, which is in data connection with the controller.

The allocation tool may be configured for allocating a particular dynamic laser beam shape for a particular cutting segment. In a simple form, the allocation tool may be provided as table data structure with a set of entries, which may be accessed with a specific cutting segment to deduce the associated dynamic laser beam shape or vice versa.

The step of allocating may be extended by applying a rule-based association algorithm. The rules for the association algorithm may be stored in a rule storage of the allocation tool and/or on another external storage, which may be accessed via a network connection by the allocation tool. In a very abstract and generic and simplified manner, the rules may be e.g., in the form:

Segment 1—shape 1 (short for: dynamic laser beam shape 1)
Segment 2—shape 2
Segment 3—shape 3
Segment 4—shape 1
Segment 5—shape 3
Segment 6—shape 4
etc., wherein a segment is defined by its type. The type may be selected from the group consisting of straight line, circle (segments), corner, parameterized curve, pierce-in, lead-in, lead-out, and/or engraving.

The rules may be amended independently from executing the method for determining transition phases for the dynamic laser beam shapes.

The association algorithm may be configured to take into account geometrical data of the specific segment and/or a cutting speed, which is set for the specific segment.

The transition tool may be configured for defining a transition phase between two consecutive specific dynamic laser beam shapes. Along straight lines with maximal cutting speed, a horseshoe-shape is assumed to fit best the user-defined performance criteria. The slower the cutting speed, the more circular the dynamic laser beam shape is assumed to be best. Different phases of the transition may be provided, e.g., the dynamic laser beam shape at full speed, in the corner at zero speed and in between with a configurable speed.

A transition phase is a transformation from a first specific dynamic laser beam shape to a following one. The transition parameters may be defined in accordance to a transfer function.

The transfer function may be selected from a catalogue or set of functions, which may be configured in a preparation phase and which may even be amended in an operating phase of the laser machine. The transfer function may be selected from a database with stored transfer functions. The transfer function may be defined e.g., according to a transfer function catalogue.

Optimal laser beam shapes are defined for each segment of the part. Each transition phase of all transition phases between two neighbored segments is proposed to be dependent on the path speed and/or acceleration and/or jerk. Any combination of speed, acceleration and jerk dependency is possible. It is also possible to determine the transition phases only dependent on the speed.

Alternatively or cumulatively, the transition phases may be determined algorithmically.

Alternatively or cumulatively, the transition phases may be determined by means of an algorithm which is configured to determine the transition phase in dependence of material properties (e.g., material type and/or material thickness), a kind of Lissajous figures and/or a kind of cutting segment before and after the transition phase.

The corresponding laser beam shape may for example be represented in a Lissajous Figure.

The first Lissajous figure (LF) is given by $$LF_1 = \begin{pmatrix} x_1 = A_1\sin(a_1 t + \phi_1) \\ y_1 = B_1\sin(b_1 t) \end{pmatrix}$$

with the deflection $x_1$ in X direction, the deflection $y_1$ in Y direction. For the deflection in X direction, the amplitude $A_1$ and frequency $a_1$ are used with the time shift $\phi_1$. Similarly for the Y direction.

The second, subsequent LF is given by $$LF_2 = \begin{pmatrix} x_2 = A_2\sin(a_2 t + \phi_2) \\ y_2 = B_2\sin(b_2 t) \end{pmatrix}$$

For simplicity, only the speed-dependent transition is shown in the following. The LF in the transition zone is dependent on the cutting speed $LF_t(v_c)$. A linear transition is defined by $$LF_t(v_c) = \begin{pmatrix} x_1 \frac{v_c}{F} + x_2\left(1 - \frac{v_c}{F}\right) \\ y_1 \frac{v_c}{F} + y_2\left(1 - \frac{v_c}{F}\right) \end{pmatrix}$$

where F represents the feed rate (desired cutting speed).

The speed-dependent transition can also have higher order exponent $e_p$:

$$LF_t(v_c) = \begin{pmatrix} x_1 \left(\frac{v_c}{F}\right)^{e_p} + x_2\left(1 - \left(\frac{v_c}{F}\right)^{e_p}\right) \\ y_1 \left(\frac{v_c}{F}\right)^{e_p} + y_2\left(1 - \left(\frac{v_c}{F}\right)^{e_p}\right) \end{pmatrix}$$

Trigonometric dependencies are possible. E.g., a speed-dependent transition with exponent $e_p$:

$$LF_t(v_c) = \begin{pmatrix} x_1 \sin\left(2\pi \frac{v_c}{F}\right)^{e_p} + x_2 \left(1 - \sin\left(2\pi \frac{v_c}{F}\right)^{e_p}\right) \\ y_1 \sin\left(2\pi \frac{v_c}{F}\right)^{e_p} + y_2 \left(1 - \sin\left(2\pi \frac{v_c}{F}\right)^{e_p}\right) \end{pmatrix}$$

Similarly, the transition function can be formulated for the acceleration or jerk dependency:

Acceleration-dependent:

$$LF_t(a_c) = \begin{pmatrix} x_1 \left(\frac{a_c}{a_c^{max}}\right)^{e_p} + x_2 \left(1 - \left(\frac{a_c}{a_c^{max}}\right)^{e_p}\right) \\ y_1 \left(\frac{a_c}{a_c^{max}}\right)^{e_p} + y_2 \left(1 - \left(\frac{a_c}{a_c^{max}}\right)^{e_p}\right) \end{pmatrix}$$

with the maximal absolute value of the acceleration $a_c^{max}$.

Jerk-dependent:

$$LF_t(j_c) = \begin{pmatrix} x_1 \left(\frac{j_c}{j_c^{max}}\right)^{e_p} + x_2 \left(1 - \left(\frac{j_c}{j_c^{max}}\right)^{e_p}\right) \\ y_1 \left(\frac{j_c}{j_c^{max}}\right)^{e_p} + y_2 \left(1 - \left(\frac{j_c}{j_c^{max}}\right)^{e_p}\right) \end{pmatrix}$$

with the maximal absolute value of the jerk $j_c^{max}$.

The method is not limited to use only one single dependency. Alternatively, a combination of speed, acceleration and/or jerk dependent transitions are possible and might be advantageous.

The assessment tool is an electronic module. The assessment tool may be a software module, implemented in a hardware module with a processor or may be a hardware module, like a FPGA or an ASIC. The assessment tool is configured for assessing the determined and applied specific dynamic laser beam shapes and/or transition phases manually by means of using a user interface and/or automatically by a sensory automatic assessment unit for providing an assessment dataset, which represents the assessment result.

In another aspect the invention relates to a computer program product comprising a computer program, the computer program being loadable into a memory unit of a computing unit, including program code sections to make the computing unit execute the method for determining transition phases, as described above, when the computer program is executed in said computing unit.

In another aspect the invention relates to a computer-readable medium, on which program code sections of a computer program are stored or saved, said program code sections being loadable into and/or executable in a computing unit to make the computing unit execute the method for determining transition phases, as described above, when the program code sections are executed in the computing unit.

The order, according to which the steps of the method of the present invention are described in the present specification, does not necessarily reflect the chronological order, according to which said steps are carried out. For example, the steps of providing an allocation tool and providing a transition tool may be executed in another sequence.

The properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale.

SHORT DESCRIPTION OF THE FIGURES

Figure 5A:
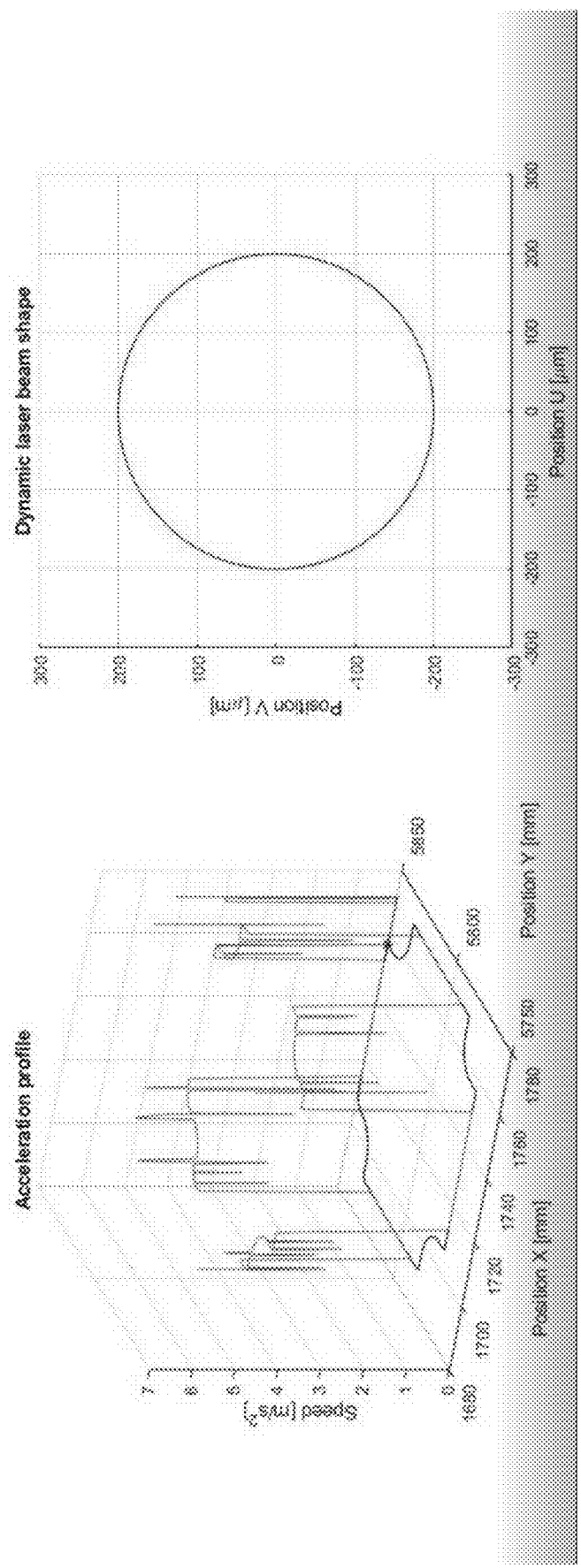
Figure 5B:
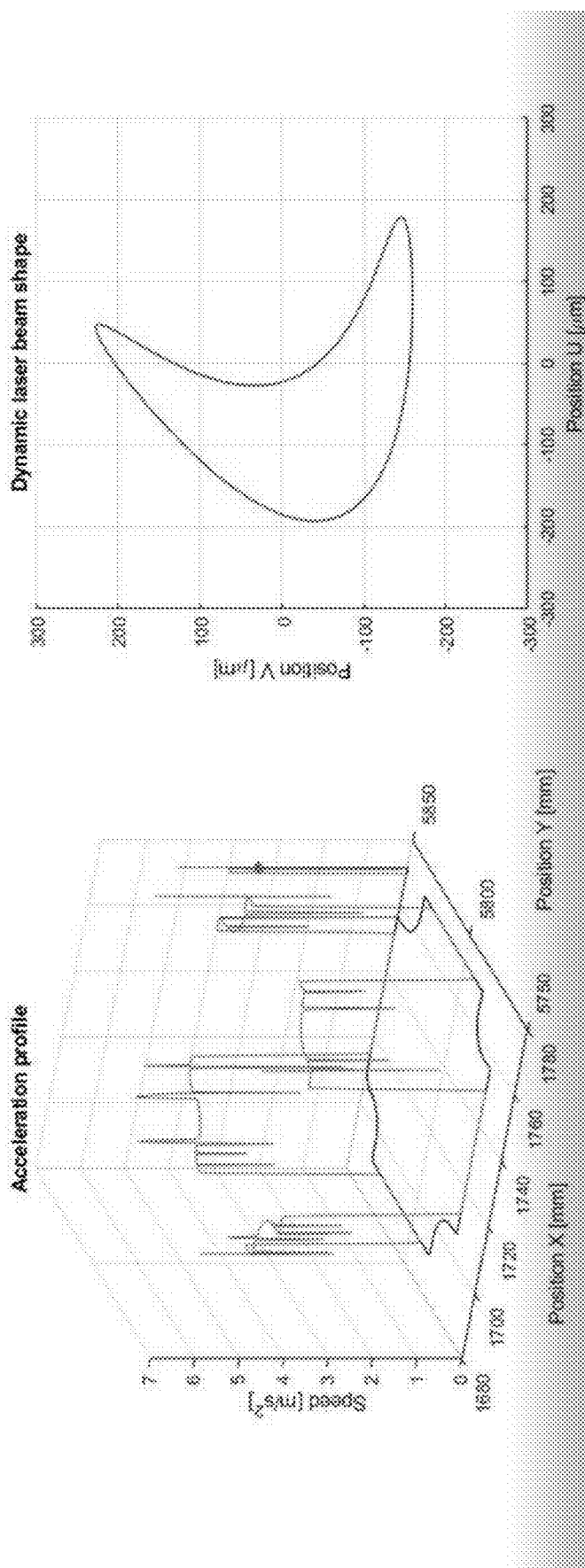
Figure 5C:
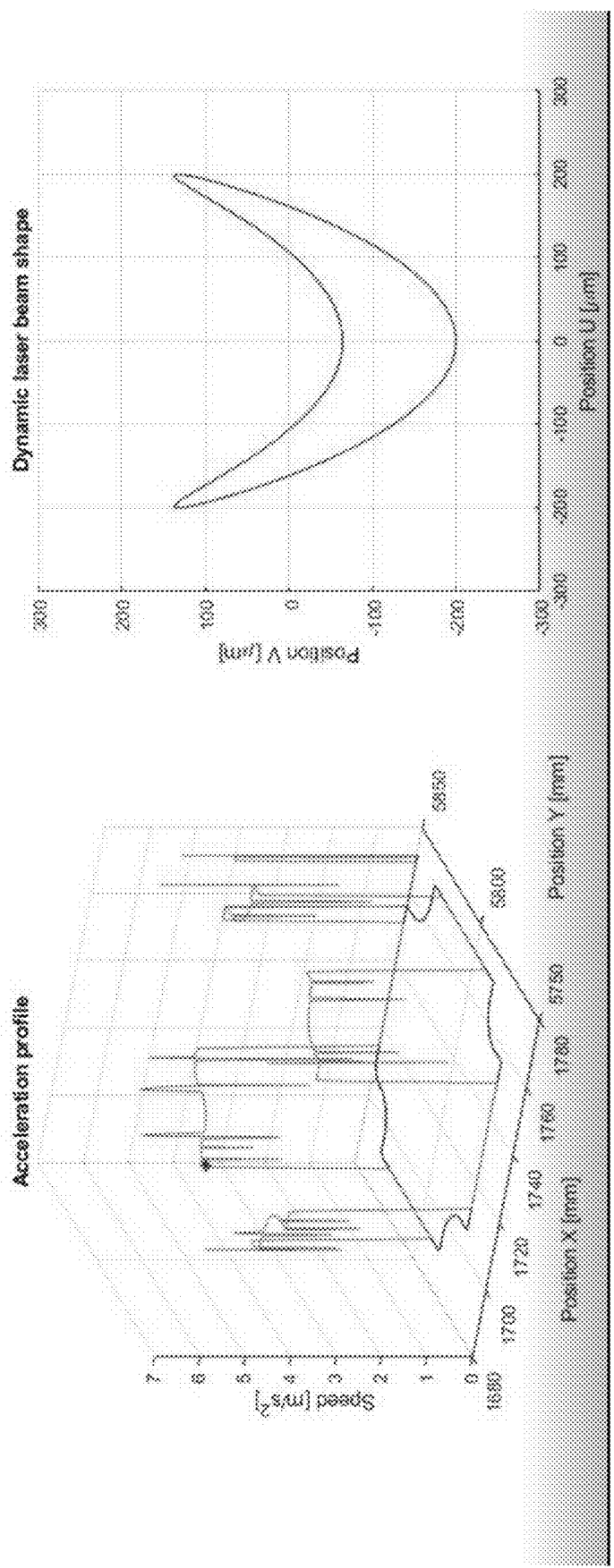
Figure 6:
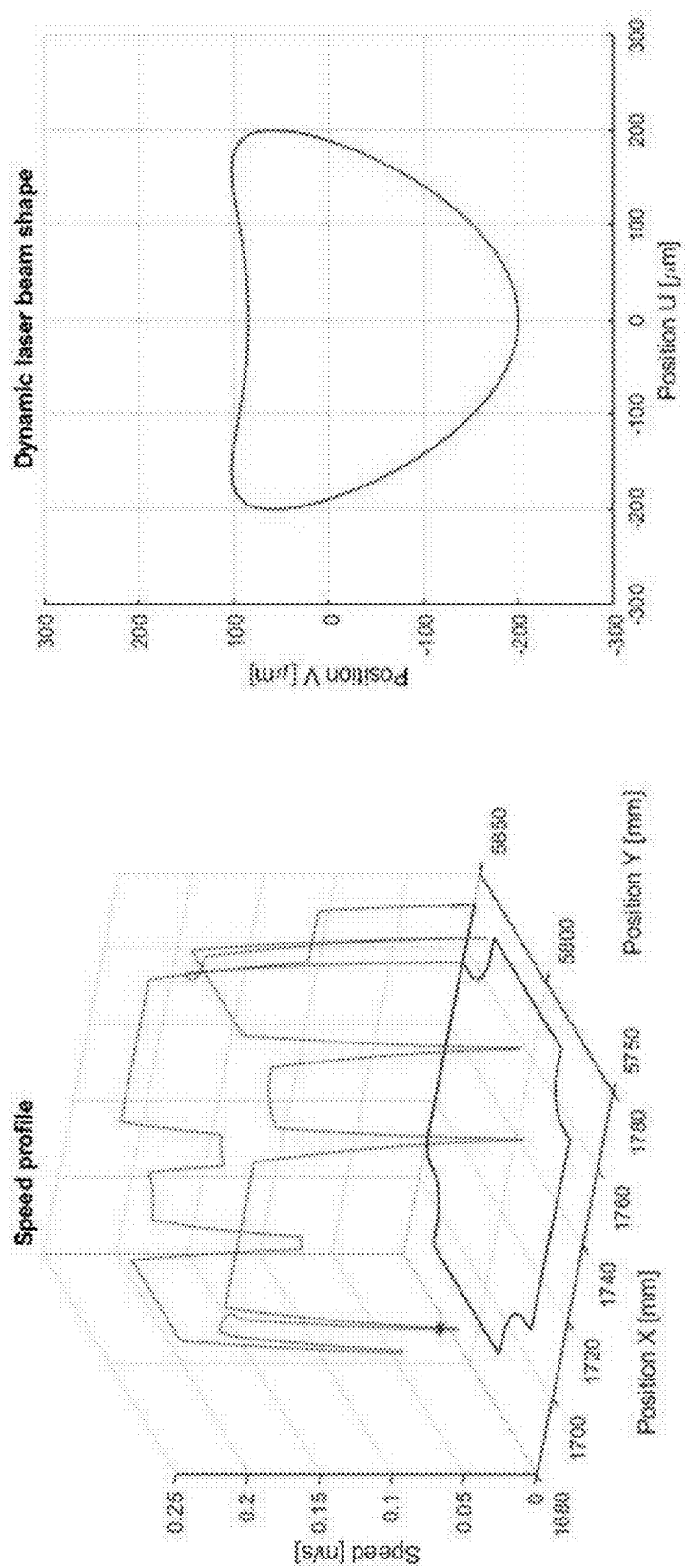
Figure 7:
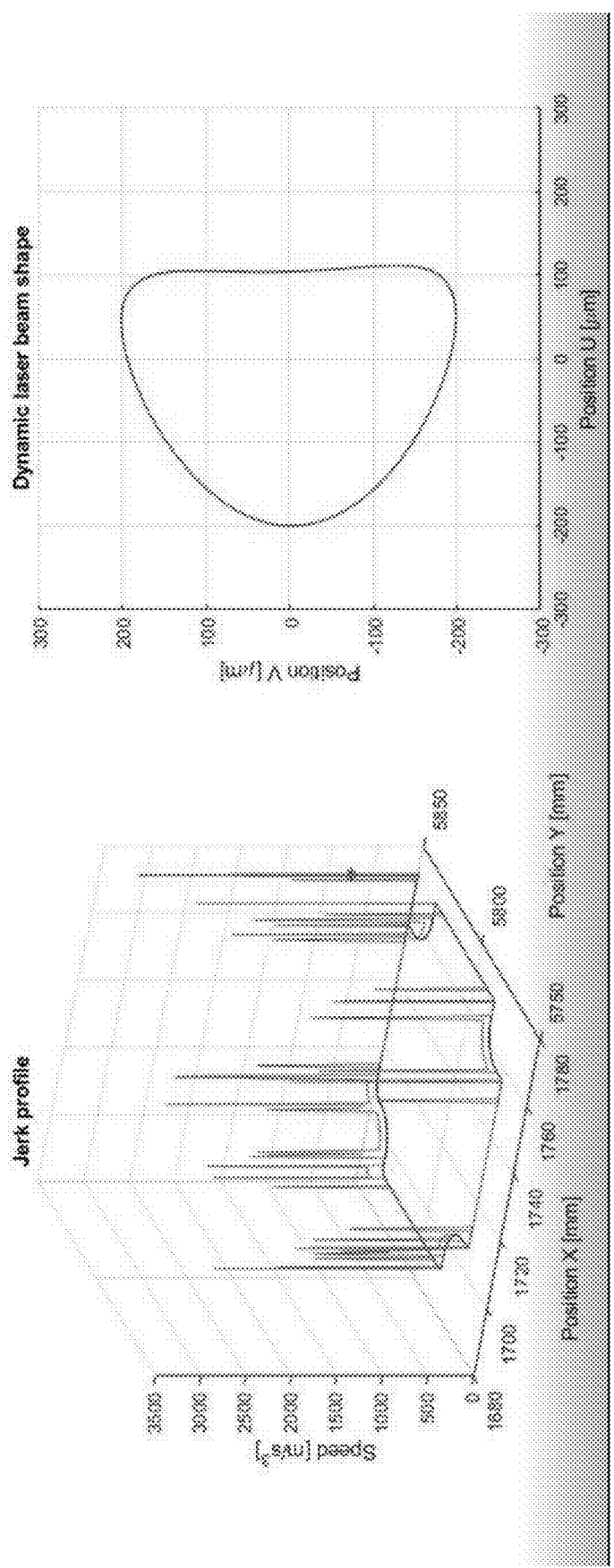
Figure 8:
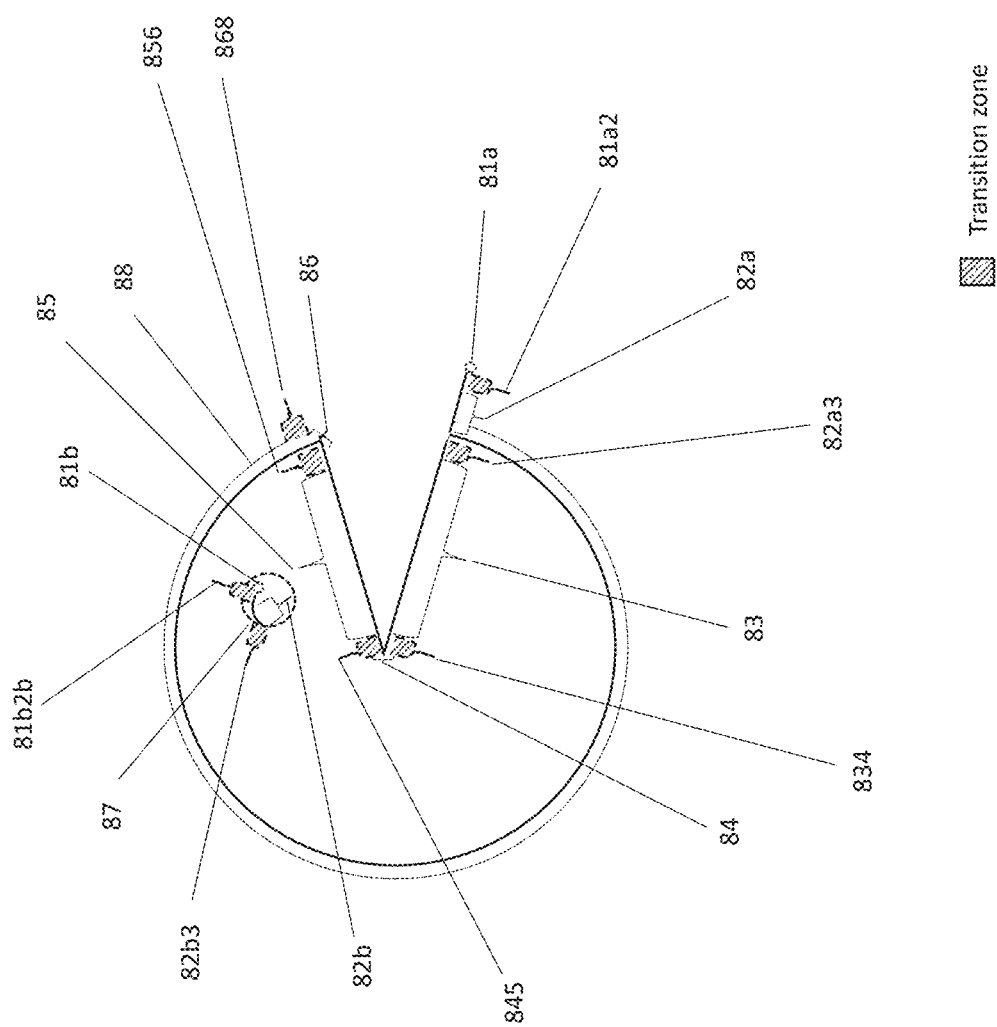
Figure 9:
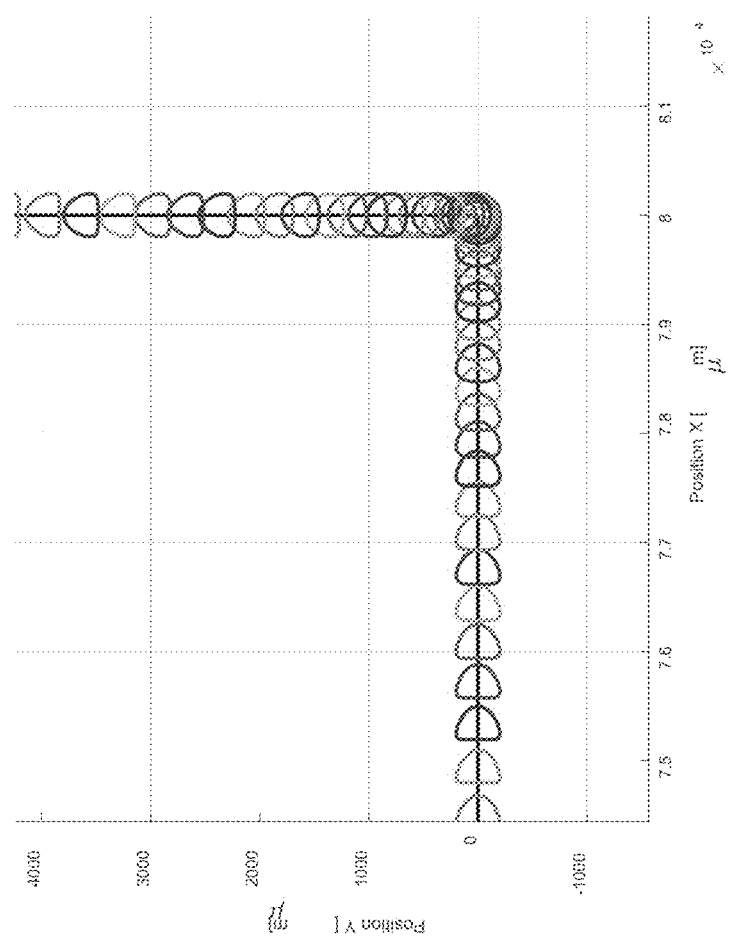

FIG. 5a to c are three examples for an acceleration-dependent allocation or transition phase, FIG. 6 is another example for a speed-dependent allocation or transition phase;

FIG. 7 is another example for a jerk-dependent allocation or transition phase and FIG. 8 is an exemplary representation of different cutting segments with allocated transition phases;

FIG. 9 is an exemplary representation of a transition zone for a sharp corner segment.

DETAILED DESCRIPTION OF THE FIGURES

The present invention provides a tool for defining transition zones for the transformation from one dynamic laser beam shape applied in a first cutting segment to a following dynamic laser beam shape of a subsequent cutting segment in a cutting sequence. The cutting segments may be e.g., a "pierce in", "straight line", "circle", "curvature", "corner" etc.

The goal of the solution described herein, is to define a smooth transition from one dynamic laser beam shape (e.g., Lissajous figure or the like) to a following one, each one used on cutting segments of a cutting sequence that are following one after the other.

A possible workflow may be:
1) Load a Cutting Plan
2) Load Set Up Data from Database
    a. Input performance criteria (user-defined weightings) by HMI;
    b. Input/load material setup data (type of material and thickness);
    c. Input/load machine setup parameters (e.g., laser power, dynamic limits of drives);
    d. Load/Extract geometrical characteristics of each segment (type and length of segment);
    e. load pre-defined dynamic laser beam shapes for each segment type in a cutting sequence;
    f. Define and load transition zones between all different dynamic laser beam shapes;
3) Execute Cutting Program According to Cutting Plan.
4) Optionally: Assess and Adapt Transition Zones if Needed Based on Performance Criteria.

Figure 1:
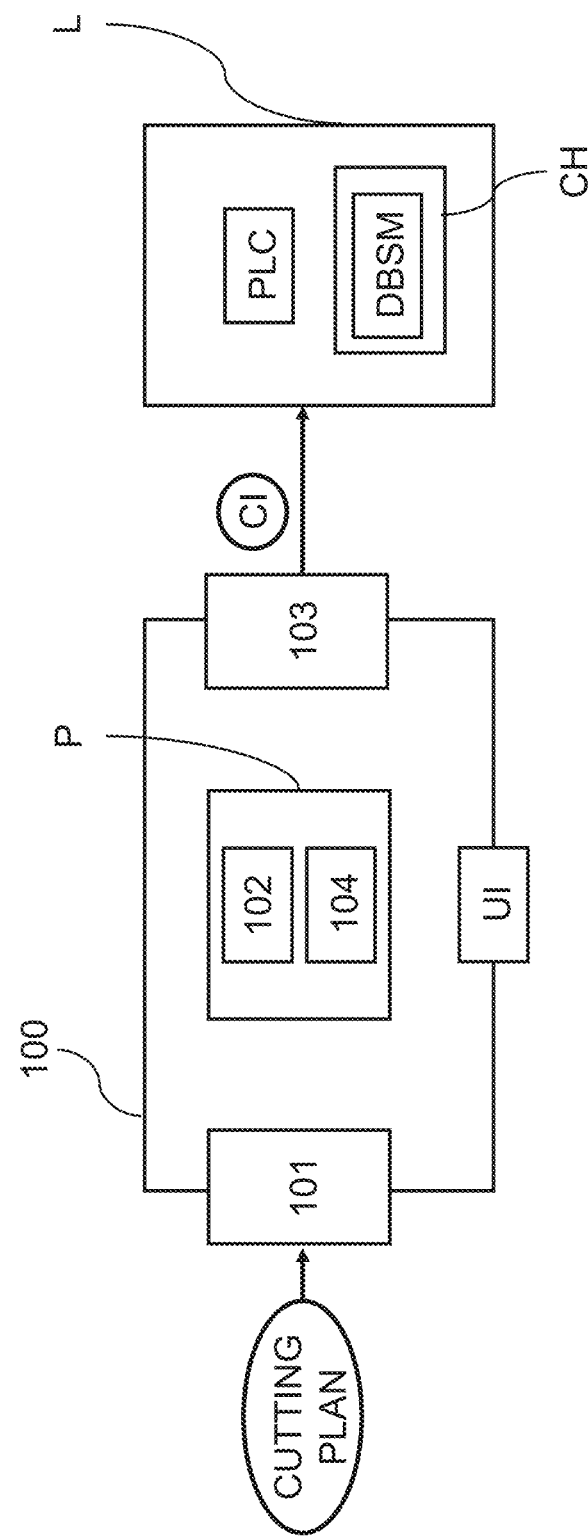
FIG. 1 is a schematic representation of a control unit for instructing a programmable logic control PLC of a laser cutting machine.

FIG. 1 shows in a schematic representation a control unit 100 for interacting with a programmable logic control PLC for controlling a laser cutting machine L.

The control unit 100 is configured to determine transition phases for transforming different dynamic laser beam shapes during or for laser cutting by means of the laser cutting machine L. The control unit 100 comprises a processor P which has implemented thereon an allocation tool 102 and a transition tool 104.

The laser machine L has a cutting head CH that comprises at least one optical model, preferably a dynamic laser beam shaping module DBSM. The spatiotemporal beam oscillation may e.g., be realized by a commercial high-dynamic 2D-scanner unit which is ready for integration into the collimated beam path of the laser cutting head. Thus, optical properties are not affected. The scanner may consist of two oscillating mirrors where each mirror has a time-dependent position, defined by a certain frequency and amplitude. The phase shift between both mirrors is the fifth parameter to specify the energy distribution. Control of the dynamic laser beam shaping module DBSM is executed by means of control instructions CI, which are provided by the control unit 100.

The control unit 100 is further configured to receive a cutting plan via a cutting plan interface 101. Based on the received cutting plan, the control unit 100 is further configured to provide control instructions CI to be forwarded to the controller PLC of the laser cutting machine L. The laser cutting machine L is configured for cutting workpieces according to a predefined cutting plan. For example, several parts may be cut out of a workpiece. Cutting is executed by moving the laser cutting head of the laser cutting machine L over the workpiece during application of a laser beam. The laser cutting machine L may be equipped with a dynamic laser beam shaping module DBSM. The dynamic laser beam shaping module DBSM is configured for dynamically varying the shape of the laser beam, e.g., by oscillating the laser beam in an angular direction with respect to the direction of propagation of the laser beam.

The control unit 100 is preferably equipped with three different interfaces:

1. first, the cutting plan interface 101 which is configured for receiving a cutting plan,
2. second a control interface 103, which is configured for transferring the calculated and provided control instructions CI to the controller PLC, and
3. third, the human machine interface UI, which is configured for data exchange with the user. For example, interim results and a final result may be provided on the human machine interface UI. Interim results may relate to the determined specific dynamic laser beam shape for each of the cutting segments in the queue of cutting segments and/or to the determined transition phase between each to consecutive dynamic laser beam shapes for each of the cutting segments of all parts to be cut according to the received cutting plan. The final result may represent the control instructions CI.

The control unit 100 further comprises an allocation tool 102 and a transition tool 104. The allocation tool 102 is configured to allocate a specific dynamic laser beam shape from a (stored) set of dynamic laser beam shapes to each cutting segment in the queue of cutting segments according to pre-defined allocation criteria. The transition tool 104 is configured for determining the transition phase between each two consecutive specific dynamic laser beam shapes. Thus, a first specific dynamic laser beam shape of the two consecutive specific dynamic laser beam shapes is transformed into a second specific dynamic laser beam shape of the two consecutive specific dynamic laser beam shapes within a certain transition time.

In the example embodiment, shown in FIG. 1, the control unit 100 is provided as separate module in addition to the controller PLC of the laser cutting machine L. For example, the control unit 100 may be deployed on a cloud-based server, being in data exchange with the local controller PLC of the laser cutting machine L. In alternative embodiments, it is also possible to implement the control unit 100 directly on the controller PLC of the laser cutting machine L.

Figure 2:
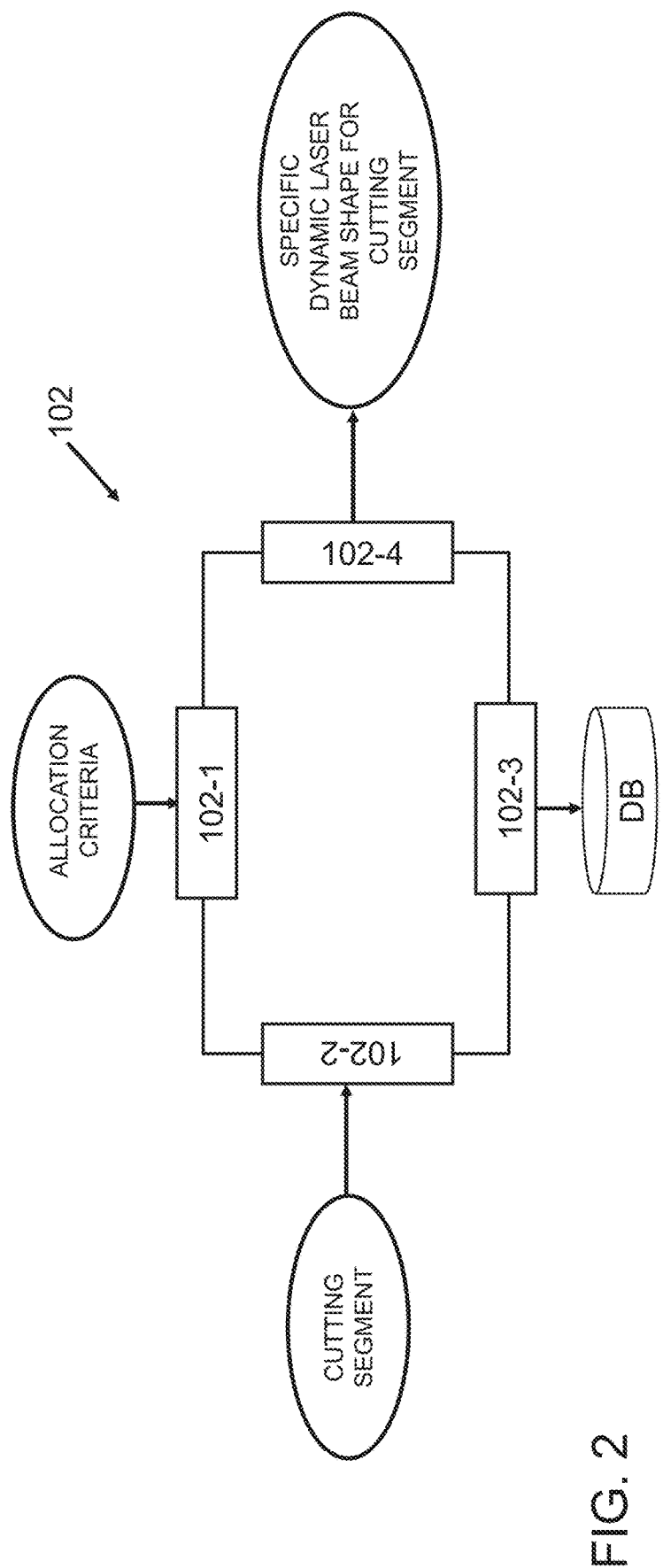
FIG. 2 is a detailed schematic representation of an allocation tool according to a preferred embodiment of the present invention.

FIG. 2 shows a more detailed representation of the allocation tool 102. The allocation tool 102 may be configured to execute an allocation algorithm in order to allocate a specific dynamic laser beam shape to each cutting segment according to pre-defined allocation criteria. The allocation algorithm may access a rule base with stored rules for determining the allocation under the given requirements (allocation criteria). Alternatively, or in addition, the allocation algorithm may be based on a trained machine learning model. The allocation tool comprises a first interface 102-1 which is configured for receiving allocation criteria, a second interface 102-2 which is configured for receiving a digital representation of a cutting segment (one after the other in the queue of cutting segments, which are defined according to the contour to be cut according to the cutting plan) and, a third interface 102-3 which is configured to access a storage or a database DB for storing a set of dynamic laser beams shapes. The storage may be implemented as a database. The allocation tool 102 further comprises of fourth interface 102-4 for providing a result of the allocation step and in particular for providing a specific dynamic laser beam shape for a specific cutting segment. The allocation criteria may be defined by an allocation module and/or by manual input and/or by accessing a storage with stored allocation criteria.

Figure 3:
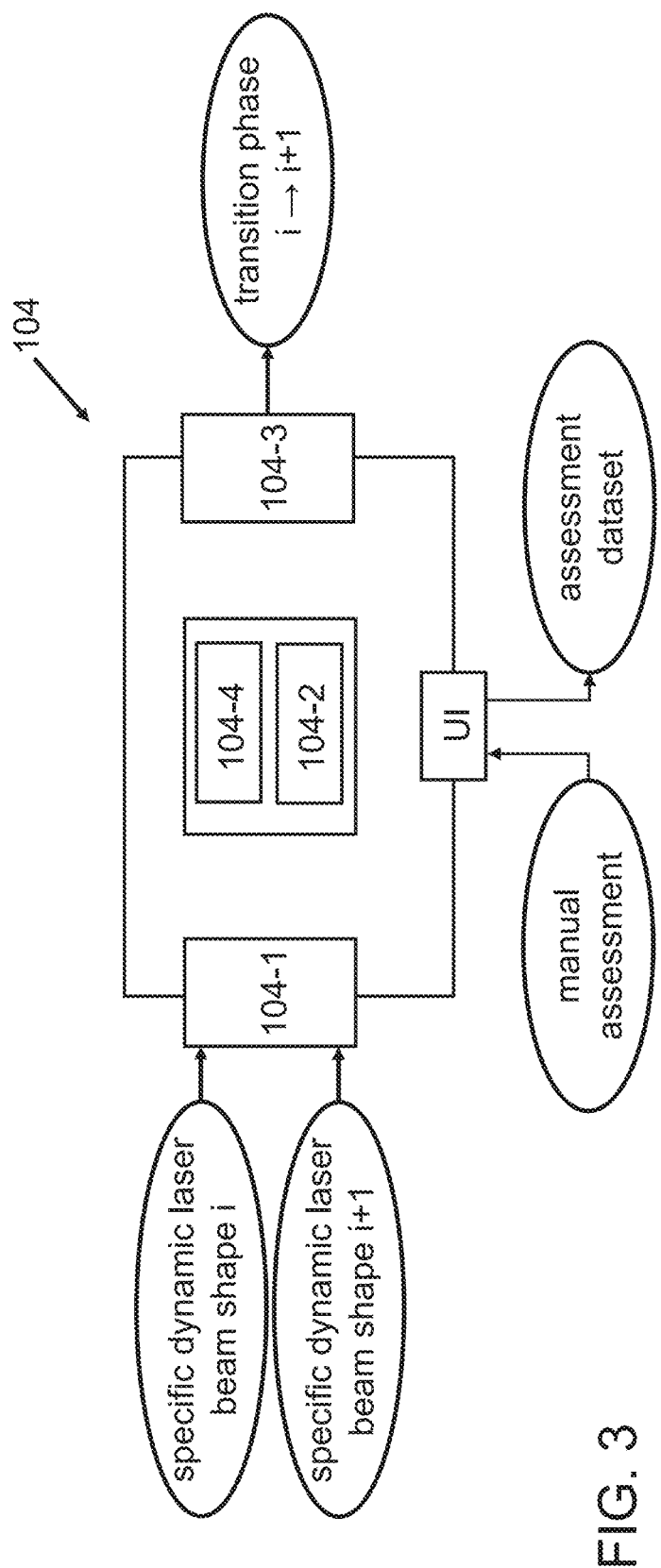
FIG. 3 is a detailed schematic representation of a transition tool according to a preferred embodiment of the present invention.

FIG. 3 shows a more detailed representation of the transition tool 104. The transition tool 104 comprises a first interface 104-1 for receiving a first or i-th and a respective consecutive second or i+1-th specific dynamic laser beam shape, which have been provided by the allocation tool 102. Further, the transition tool 104 comprises a second interface UI, which may be provided as a human machine interface, HMI. This second interface UI may serve for receiving a manual assessment data set which represents a manual assessment of the determined and applied specific dynamic laser beam shapes and/or transition phases. The assessment may be a quality assessment, a performance assessment, and energy consumption assessment, and/or a process stability assessment. The second interface UI may further serve for providing a result of an automatic assessment by means of using an automatic assessment unit, which is depicted in FIG. 3 with reference 104-2. The second interface UI may further serve for providing the calculated transition phases as an interim result for the purpose of (user-based) verification. The transition tool 104 further comprises another interface which serves as result interface 104-3 and which is configured for providing the determined transition phases as final result. The transition tool 104 may further comprise a configuration tool 104-4, which is configured for providing configuration parameters for configuring the determination of the transition zones or phases. For example, the configuration tool 104-4 may be used to determine whether the determination or calculation of the transition phases should be speed-dependent and/or acceleration-dependent and/or jerk-dependent. The configuration tool 104-4 may be provided as a software module which generates respective entry fields on the human machine interface for specifying the assessment by means of receiving numerical input or categorial input data.

Figure 4:
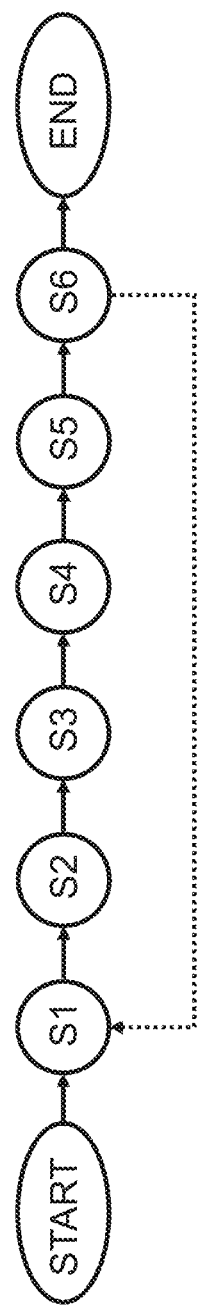
FIG. 4 is a flow chart of a method according to a preferred embodiment of the present invention.

FIG. 4 shows a flowchart of an embodiment of a method for determining transition phases for transforming different dynamic laser beam shapes for laser cutting. After start of the method, in step S1, a cutting plan is received. In step S2, the allocation tool 102 is provided. In step S3, the allocation tool 102 is accessed iteratively for determining specific dynamic laser beam shapes for each cutting segment of the queue of cutting segments. In step S4, the transition tool 104 is provided. The transition tool 104 is configured for determining the transition phase between each two determined specific consecutive dynamic laser beams shapes, wherein the first specific dynamic laser beam shape of the two consecutive specific dynamic laser beam shapes is transformed into a second specific dynamic laser beam shape of the two consecutive specific dynamic laser beam shapes. In step S5, the transition tool 104 is accessed for determining all transition phases between each two consecutive specific dynamic laser beam shapes. In step S6 control instructions CI are provided for controlling the laser cutting machine L for executing the received cutting plan by applying the determined specific dynamic laser beam shape, which has been determined by the allocation tool 102 and by applying the transition phases for each of the cutting segments of all parts of the workpiece to be cut according to the cutting plan, wherein the transition phases have been determined by the transition tool 104. After this, the method may end or may be reiterated as shown in FIG. 4 with dotted lines.

FIG. 5a, b, and c show an acceleration dependent determination of the transition phase between each two consecutive specific dynamic laser beam shapes. On the left side of FIG. 5a, an acceleration profile for the cutting contour according to the cutting plan is depicted. In the X- and Y-plane the position in X and Y direction is depicted and the speed is represented on the Z axis. On the right-hand side of FIG. 5a the dynamic laser beam shape is depicted (here: a circle) for a position on the contour, which is represented in the acceleration profile on the left-hand side with a star (in the upper right corner of the cutting contour). Generally, the matching of a (point of the) cutting contour segment and dynamic laser beam shape is provided by the allocation tool 102. FIG. 5b shows the same acceleration profile as shown in FIG. 5a and another dynamic laser beam shape, which is shown on the right side and which has been allocated by the allocation tool 102. FIG. 5c shows the same acceleration profile as shown in FIGS. 5a and 5b and still another allocated dynamic laser beam shape, which is shown on the right side of FIG. 5c and which also has been allocated by the allocation tool 102.

FIG. 6 shows another preferred embodiment of the present invention, where the determination of the transition phases between each two consecutive specific dynamic laser beam shapes is executed in dependence of the cutting speed of the laser cutting head, being moved over the workpiece surface for the purpose of cutting. As can be seen on the left-hand side of FIG. 6, the speed profile is depicted for the same cutting contour, as shown in FIG. 5. On the right-hand side of FIG. 6 a specific dynamic laser beam shape is depicted, which is allocated by the allocation tool 102 for the point in the cutting segment within the cutting contour, which is shown on the left-hand side by the star (on the lower left corner of the cutting contour).

FIG. 7 still shows another preferred embodiment of the present invention, where the determination of the transition phases between each two consecutive specific dynamic laser beam shapes is executed dependent on the jerk. Accordingly, on the left-hand side of FIG. 7 a jerk profile is depicted for the contour, which is also the basis of FIGS. 5 and 6. On the right-hand side of FIG. 7 an allocated dynamic laser beam shape is depicted, which is allocated to a cutting segment, which comprises the "star", as depicted on the left-hand side of FIG. 7 (upper right corner of the contour).

A part has different geometrical dimensions and shapes, which result in different conditions for the laser cutting process (e.g., cutting speed). By dividing the geometry into different segments, optimal laser beam shapes can be found for each of these segments. For example, a corner segment may have other cutting properties than a straight-line segment, which generally, may be cut with higher cutting speed. The transition between the segments will be performed in a smooth way (continuous transition between segments). At least, the following segments are relevant:
Straight line;
Circle or circle segments with a configurable particular radius;
Corner with a configurable particular angle;
Parameterized curve;
Pierce-in;
Lead-in;
Lead-out and/or
Engraving.

FIG. 8 shows an example cutting contour with mainly two different cutting segments and with different transition zones or transitions phases. As can be seen in the example, shown in FIG. 8, the cutting contour comprises a part of a circle element with one circle cut-out and a small circle cutting segment above the cut-out and in the upper right portion of the circle cutting contour. The transition zones are depicted in FIG. 8 by a left hatched pattern.

Reference numeral 81a depicts a "pierce in" cutting segment for the outer circle cutting contour. Reference numeral 81a2 represents the dynamic laser beam shaping transition zone or pattern from segment 81a to segment 82a. The latter segment 82a represents a "lead in straight" cutting segment. Reference numeral 82a3 depicts that dynamic laser beam shaping transition zone between segment 82a to segment 83. The latter segment 83 represents "straight-line" cutting segment, there the laser cutting head may be moved quicker compared to corner segments. Reference numeral 834 represents the dynamic laser beam shaping transition zone or phase between segment 83 and segment 84. The segment 84 is "right turn corner" cutting segment. Reference numeral 845 represents the dynamic laser beam shaping transition zone or phase between segment 84 and segment 85. Segment 85 refers to another straight-line cutting segment. Reference numeral 856 represents a dynamic laser beam shaping transition zone or phase between segment 85 and segment 86. Segment 86 represents a "left turn corner" cutting segment.

As can be seen in FIG. 8 the contour further comprises of another circle cutting segment, represented in FIG. 8 by reference numeral 87. This circle contour has a "pierce in" cutting segment, represented in FIG. 8 with reference 81b. The dynamic laser beam shaping transition zone between segment 81b and segment 82b is represented in FIG. 8 with the reference numeral 81b2b.

FIG. 9 shows a position-based diagram for the different dynamic laser beam shapes and its transition phases in between, there the laser beam shape is oriented in cutting direction, where cutting is first in X direction followed by cutting in Y direction.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

The invention claimed is:

1. A computer-implemented method for determining transition phases for transforming different dynamic laser beam shapes for laser cutting a workpiece by means of a laser cutting machine, comprising at least one optical module that includes a dynamic laser bean shaping module (DBSM), for dynamically varying a shape of the laser beam, the method comprising:
   receiving a cutting plan, at a control unit of the laser cutting machine, to be processed for cutting out parts of a workpiece, wherein each part is defined by a cutting contour including cutting segments, which are ordered in a queue;
   providing an allocation tool, in the control unit, which is configured to allocate a specific dynamic laser beam shape from a set of dynamic laser beam shapes to each cutting segment in the queue of cutting segments according to predefined allocation criteria;
   accessing the allocation tool iteratively for determining the specific dynamic laser beam shape for each cutting segment of the queue of cutting segments;
   providing a transition tool, in the control unit, for determining transition phases between each two determined consecutive specific dynamic laser beam shapes, wherein a first specific dynamic laser beam shape of the two consecutive specific dynamic laser beam shapes is transformed into a second specific dynamic laser beam shape of the two consecutive specific dynamic laser beam shapes within a transition time, wherein the transition time is in a range in between 0.05 ms and 10.000 ms, wherein no hard switch from one dynamic laser beam shape to a directly following or consecutive dynamic laser beam shape is applied and the transition between different dynamic laser beam shapes is a continuous transition between the two determined consecutive specific dynamic laser beam shapes;
   accessing the transition tool for determining all transition phases between each two determined consecutive specific dynamic laser beam shapes; and
   providing control instructions for controlling the laser cutting machine for and cutting the workpiece, wherein cutting the workpiece includes executing the received cutting plan by applying during cutting:
      the specific dynamic laser beam shape for each of the cutting segments in the queue of cutting segments, which has been determined by the allocation tool, and
      the determined transition phases between each two consecutive specific dynamic laser beam shapes for each of the cutting segments of all parts to be cut according to the received cutting plan, wherein the transition phases have been determined by the transition tool.

2. The method according to claim 1, wherein the cutting segments are selected from a group, comprising:
   a straight line;
   a circle or circle segments with a configurable particular radius;
   a corner with a configurable particular angle
   a parameterized curve;
   a pierce-in;
   a lead-in;
   a lead-out and/or an engraving.

3. The method according to claim 1, wherein the allocation tool and/or the transition tool comprises a trained neural network model wherein the trained neural network model has been trained to determine a transition phase for transforming a dynamic laser beam shape between two consecutive cutting segments and further has been trained with a training algorithm based on annotated or partially annotated training data, which comprise an assessment of a cutting result with the applied transition phase.

4. The method according to claim 1, wherein the transition tool comprises an assessment tool, wherein the assessment tool is configured for assessing the determined and applied specific dynamic laser beam shapes and/or transition phases manually by means of using a user interface and/or automatically by a sensory automatic assessment unit for providing an assessment dataset.

5. The method according to claim 4, wherein the assessment dataset comprises setting a configurable share of different assessment criteria in common, comprising a quality assessment, a performance assessment, an energy consumption assessment, and/or a process stability assessment, wherein the different assessment criteria have interdependencies which are modelled on a user interface selection button, provided on a human machine interface.

6. The method according to claim 1, wherein the transition phases for each two consecutive specific dynamic laser beam shapes are determined specifically for a type of material property and/or a type of cutting machine.

7. The method according to claim 1, wherein the transition phases for each two consecutive specific dynamic laser beam shapes are determined in dependence of a speed and/or acceleration and/or jerk of the laser cutting head and/or of a type of cutting segment and/or of laser cutting process parameters, including laser power and/or dynamic limits of drives.

8. The method according to claim 1, wherein the transition phases for each two consecutive specific dynamic laser beam shapes are determined by generating focal point oscillation schemes by spatiotemporal distribution of laser energy over a focal plane and/or a material surface with respect to:
   a frequency in X and Y and Z direction;
   an amplitude in X and Y and Z direction; and/or
   a phase shift in Y and Z compared to X direction.

9. The method according to claim 1, wherein in determining the transition phases between each two consecutive specific dynamic laser beam shapes where a first specific dynamic laser beam shape of the two consecutive specific dynamic laser beam shapes is transformed into a second specific dynamic laser beam shape of the two consecutive specific dynamic laser beam shapes, a transfer function $f$ is applied which transfers the first specific dynamic laser beam shape of the two consecutive specific dynamic laser beam shapes in the second specific dynamic laser beam shape, wherein the transfer function $f$ transforms a frequency, an amplitude and/or a phase shift of the first dynamic laser beam shape and/or wherein the transfer function may be linear or logarithmic.

10. The method according to claim 1, wherein the transition tool for determining the transition phases between each two consecutive specific dynamic laser beam shapes is configured for determining a transition phase between each two consecutive specific dynamic laser beam shapes, which differ from each other.

11. A non-transitory computer-readable storage medium having stored therein instructions that are executable by a processor causing the processor to perform the method of claim 1.

12. A control unit for providing control instructions for controlling a laser cutting machine by determining transition phases for transforming different dynamic laser beam shapes for the laser cutting machine, comprising at least one optical module that includes a dynamic laser bean shaping module (DBSM) for dynamically varying the shape of the laser beam, the control unit comprising:
- a cutting plan interface for receiving a cutting plan to be processed for cutting out parts of a workpiece, wherein each part is defined by a cutting contour consisting of cutting segments, which are ordered in a queue;
- an allocation tool configured to allocate a specific dynamic laser beam shape from a set of dynamic laser beam shapes to each cutting segment in the queue of cutting segments according to predefined assessment criteria;
- a transition tool configured to determine transition phases between each two consecutive specific dynamic laser beam shapes, wherein a first specific dynamic laser beam shape of the two consecutive specific dynamic laser beam shapes is transformed into a second specific dynamic laser beam shape of the two consecutive specific dynamic laser beam shapes within a transition time, wherein the transition time is in a range in between 0.05 ms and 10.000 ms, wherein no hard switch from one dynamic laser beam shape to a directly following or consecutive dynamic laser beam shape is applied and the transition between different dynamic laser beam shapes is a continuous transition between the two determined consecutive specific dynamic laser beam shapes; and
- a processor configured to access the allocation tool iteratively for determining a specific dynamic laser beam shape for each cutting segment of the queue of cutting segments and wherein the processor is further configured to access the transition tool for determining all transition phases between each two determined consecutive specific dynamic laser beam shapes and wherein the processor is configured for providing control instructions for controlling the laser cutting machine for cutting the workpiece, wherein cutting the workpiece includes executing the received cutting plan by applying during cutting:
- the specific dynamic laser beam shape for each of the cutting segments in the queue of cutting segments, which has been determined by the allocation tool, and
- the transition phases between each two determined consecutive specific dynamic laser beam shapes for each of the cutting segments of all parts to be cut according to the received cutting plan, wherein the transition phases have been determined by the transition tool.

* * * * *